United States Patent [19]

Nademlejnsky

[11] Patent Number: 4,826,261

[45] Date of Patent: May 2, 1989

[54] CARROUSEL HOLDER FOR COMPUTER DISKS

[76] Inventor: Jan Nademlejnsky, 149 Berens Place, Fort McMurray, Alta, Canada, T9H 1X1

[21] Appl. No.: 189,716

[22] Filed: May 3, 1988

[51] Int. Cl.$^4$ .............................................. A47B 81/06
[52] U.S. Cl. ..................................... 312/11; 211/194; 312/111; 312/252
[58] Field of Search ................. 312/11, 305, 111, 252; 220/4 C, 40; 211/194

[56] References Cited

U.S. PATENT DOCUMENTS

| | | | |
|---|---|---|---|
| 860,658 | 7/1907 | Hawthorne et al. | 312/252 X |
| 1,116,599 | 11/1914 | Madsen | 312/305 X |
| 1,542,115 | 6/1925 | Weis | 220/40 |
| 3,341,266 | 9/1967 | Schecter et al. | 312/252 X |
| 3,692,376 | 9/1972 | McKinsey et al. | 312/11 |
| 3,736,036 | 5/1973 | Mathus | 312/11 X |
| 3,765,738 | 10/1973 | Cobb | 206/387 |
| 3,862,787 | 1/1975 | Hilsinger | 206/387 |
| 3,889,817 | 6/1975 | Berkman | 206/387 |
| 4,143,928 | 3/1979 | Easton | 312/252 X |
| 4,221,440 | 9/1980 | Morgan | 206/387 |

Primary Examiner—Joseph Falk
Attorney, Agent, or Firm—Jerry T. Kearns

[57] ABSTRACT

A carrousel holder for computer disks has a circular stationary base plate having an upper surface with rotary wheels spaced about a circle. A bottom surface of a carrousel wheel has an annular track which is supported for rotation by the wheels. The carrousel wheel has a central cylindrical hub which rotates about a stationary central cylindrical tube. Vertically extending dividers are spaced around a circle on an upper surface of the carrousel wheel. A hollow cylindrical housing has a central circular aperture which is secured coaxially to the stationary central tube. A sliding door is formed in the side wall of the stationary housing. A radially outwardly extending rim of the carrousel wheel extends beneath the bottom of the cylindrical housing. Color coded markings are provided on a stepped cylindrical side wall of the carrousel wheel for providing a location reference for various computer disks stored between the dividers. Arcuate cutouts in the cylindrical side wall of the housing provide better access to the carrousel wheel rim. The top wall of the housing has an annular recess for engagement with an annular ledge formed by a central circular recess formed in the bottom of the stationary base plate. This allows a plurality of carrousel holders to be stacked one on top of the other. The central tube of each carrousel holder forms a storage compartment for pens, pencils, etc., and has a removable cover.

2 Claims, 6 Drawing Sheets

CARROUSEL HOLDER FOR COMPUTER DISKS

BACKGROUND OF THE INVENTION

1. Field of the Invention

The present invention relates to carrousel holders, and more particularly pertains to a new and improved carrousel holder for the storage of computer disks. Personal computers have become increasingly popular in today's society. These personal computers utilize a variety of different sizes of magnetic disks for the storage of software and data. While many computers are equipped with non-removable hard disks, these computers must still be equipped with a drive for removable disks, because software is marketed on these removable disks. Additionally, removable magnetic disks are frequently utilized for back up of hard disk data. This increased usage of personal computers and removable magnetic computer disks has created a computer disk storage problem. Computer storage disks are relatively sensitive, and may be ruined by rough handling, exposure to dust or by bending. Additionally, pressing computer disks tightly together in a stack can result in a loss of some data on the disks. Because a relatively large number of computer disks are utilized by a typical computer user, a system for enabling quick and convenient storage and retrieval of any particular desired disk is required. In order to overcome these problems, the present invention provides a stackable carrousel holder for facilitating the protected, indexed storage of a large number of computer disks.

2. Description of the Prior Art

Various types of carrousel holders are known in the prior art. A typical example of such a carrousel holder is to be found in U.S. Pat. No. 3,765,738, which issued to L. Cobb on Oct. 16, 1973. This patent discloses an enclosed cassette tape holder including a circular magazine accessible through sliding doors and having a numbered index visible through the top wall to indicate the cassette available through the sliding doors. A chart mounted beneath the holder may be slid to a visible position to enable viewing of a title and number list of the cassettes stored in the holder. U.S. Pat. No. 3,862,787, which issued to L. Hilsinger on Jan. 28, 1975, discloses a container for stereo tape cartridges which includes a multi-sided housing having a plurality of receptacles in the respective sides thereof. Each receptacle includes a rearwardly positioned spring normally urging outward any cartridge stored therein, and a retainer to engage the forward end of the cartridge, restraining its outward movement. A slide mounting bracket allows the housing to be indexed to provide access to any desired side. U.S. Pat. No. 3,889,817, which issued to J. Berkman on June 17, 1975, discloses a rack for storing magnetic tape cartridges and cassettes. Stackable rack elements are assembled on a supporting structure which allows the stacked racks to be rotated for providing access to any of the stored cassettes. U.S. Pat. No. 4,221,440, which issued to J. Morgan on Sept. 9, 1980, discloses a tape cartridge holder for storing tape cassettes which utilizes a carrousel including a pair of disks rotatably mounted within a housing. The pair of disks each have a plurality of cartridge holding receptacles arranged in a spaced circular array. The disks are maintained in a spaced apart relation by a hub secured within the housing.

While the above mentioned devices are suited for their intended usage, none of these devices provide a carrousel holder suitable for the protected storage of a large number of computer disks. Additionally, none of the aforesaid devices enable carrousel holders to be stacked one atop the other, without precluding access to the contents of any of the holders. Inasmuch as the art is relatively crowded with respect to these various types of carrousel holders, it can be appreciated that there is a continuing need for and interest in improvements to such carrousel holders, and in this respect, the present invention addresses this need and interest.

SUMMARY OF THE INVENTION

In view of the foregoing disadvantages inherent in the known types of carrousel holders now present in the prior art, the present invention provides an improved carrousel holder for computer disks. As such, the general purpose of the present invention, which will be described subsequently in greater detail, is to provide a new and improved carrousel holder for computer disks which has all the advantages of the prior art carrousel holders and none of the disadvantages.

To attain this, a representative embodiment of the concepts of the present invention is illustrated in the drawings and makes use of a circular stationary base plate having a plurality of rotary wheels spaced about a circle on an upper surface thereof. A rotary carrousel wheel has a bottom surface provided with an annular track which rotates in contact with the base plate wheels. The carrousel wheel has a central cylindrical hub which rotates about a stationary central cylindrical tube. A plurality of vertically extending dividers are spaced around a circle on an upper surface of the carrousel wheel. A hollow cylindrical housing has a central circular aperture which is secured coaxially to the stationary central tube. A sliding door is formed in the cylindrical side wall of the stationary housing. A radially outwardly extending rim of the carrousel wheel extends beneath the bottom of the cylindrical housing and may be manually rotated. Color coded markings are provided on a stepped cylindrical side wall of the carrousel wheel for providing indication of the relative locations of various computer disks stored between the dividers on the upper surface of the carrousel wheel. Arcuate cutouts are provided in the cylindrical side wall of the housing for providing better access to the carrousel wheel rim. The top wall of the housing is provided with an annular recess for engagement with an annular ledge formed by a central circular recess formed in the bottom of the stationary base plate. By virtue of this arrangement, a plurality of carrousel holders may be stacked one on top of the other. The hollow central tube of each carrousel holder forms a storage compartment for pens, pencils, etc., and is provided with a removable cover.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved carrousel holder for computer disks which has all the advantages of the prior art carrousel holders and none of the disadvantages.

It is another object of the present invention to provide a new and improved carrousel holder for computer disks which may be easily and efficiently manufactured and marketed.

It is a further object of the present invention to provide a new and improved carrousel holder for computer disks which is of a durable and reliable construction.

An even further object of the present invention is to provide a new and improved carrousel holder for computer disks which is susceptible of a low cost of manufacture with regard to both materials and labor, and which accordingly is then susceptible of low prices of sale to the consuming public, thereby making such carrousel holders economically available to the buying public.

Still yet another object of the present invention is to provide a new and improved carrousel holder for computer disks which provides in the apparatuses and methods of the prior art some of the advantages thereof, while simultaneously overcoming some of the disadvantages normally associated therewith.

Still another object of the present invention is to provide a new and improved carrousel holder for computer disks which provides stackable storage facilities for the protected indexed storage of a large number of computer disks.

Yet another object of the present invention is to provide a new and improved carrousel holder for computer disks which utilizes a stationary base plate and housing which enclose a color coded rotary storage carrousel wheel.

Even still another object of the present invention is to provide a new and improved carrousel holder for computer disks which provides a central storage receptacle for the storage of pens, pencils, etc.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
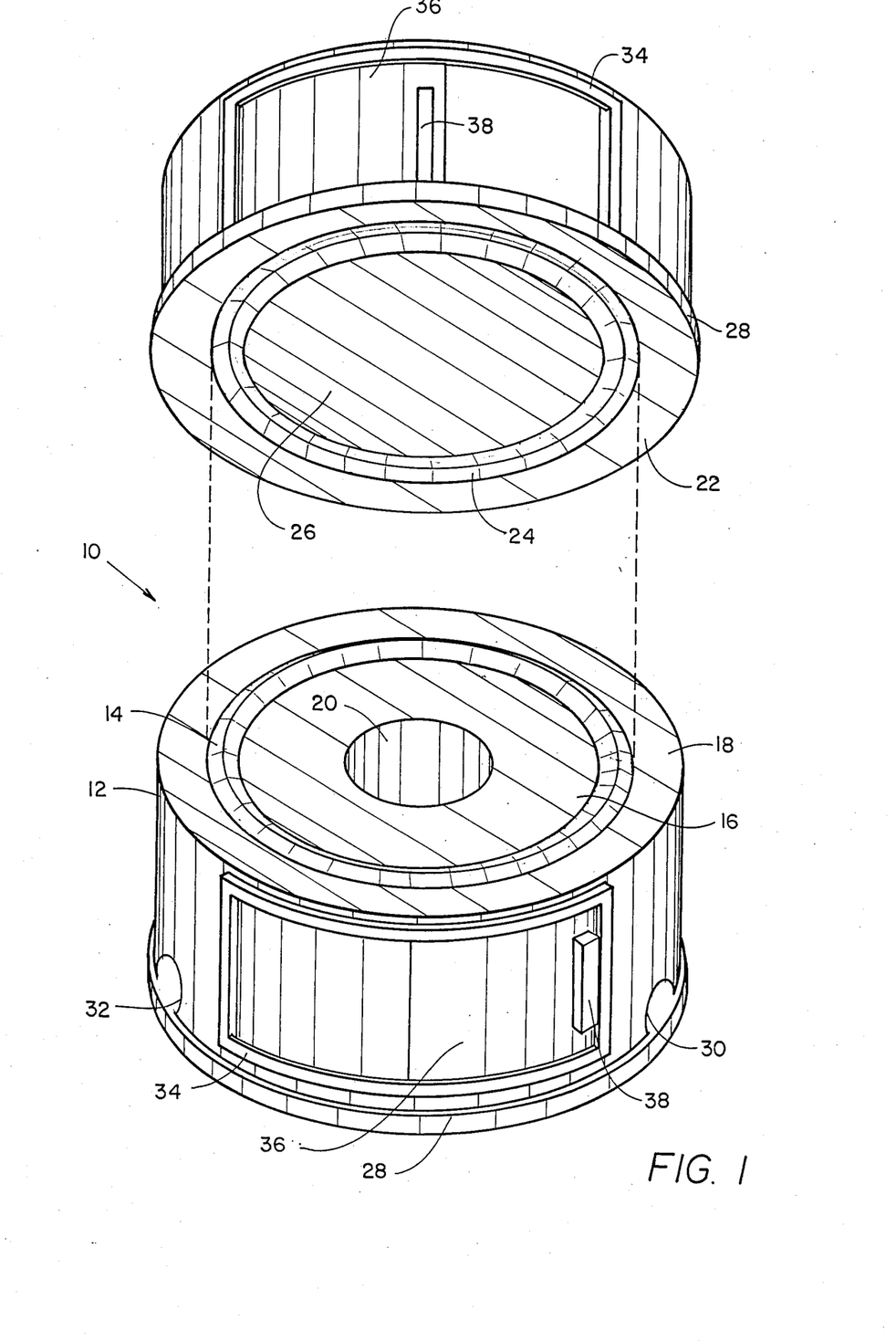
FIG. 1 is a perspective view illustrating the manner of stacking a pair of carrousel holders according to the present invention.

With reference now to the drawings, and in particular to FIG. 1 thereof, a new and improved carrousel holder for computer disks embodying the principles and concepts of the present invention and generally designated by the reference numeral 10 will be described.

More specifically, it will be noted that the first embodiment 10 of the invention includes a hollow cylindrical housing 12 which is preferably formed from a transparent unbreakable plastic material. An annular V-shaped step 14 is formed on the top wall of the housing 12. The annular step 14 separates an inner circular top wall portion 16 and an outer circular top wall portion 18, which each have the same height. A central circular aperture 20 is formed in the top wall of the housing 12. A circular stationary base plate 26 adjacent the bottom of the housing 12 has a circular V-shaped recess 24 dimensioned for engagement with the step 14 on the top wall of the other carrousel holder. By virtue of this construction, as many carrousel holders 10 as desired may be stacked one on top of another. A rotary carrousel wheel is enclosed by the housing 12, and has a rim 28 which extends radially outwardly, below the bottom of the cylindrical side wall of the housing 12. A pair of arcuate cutouts 30 and 32 at the bottom edge of the cylindrical side wall of the housing 12 provide better access to the enclosed carrousel wheel. An arcuate rectangular opening is formed in the cylindrical side wall of the housing 12 and is framed by an arcuate rectangular door slide track 34. An arcuate rectangular sliding door 36 is received for sliding movement in the track 34. A handle 38 is provided on the outer surface of the door 36.

Figures 2, 3:
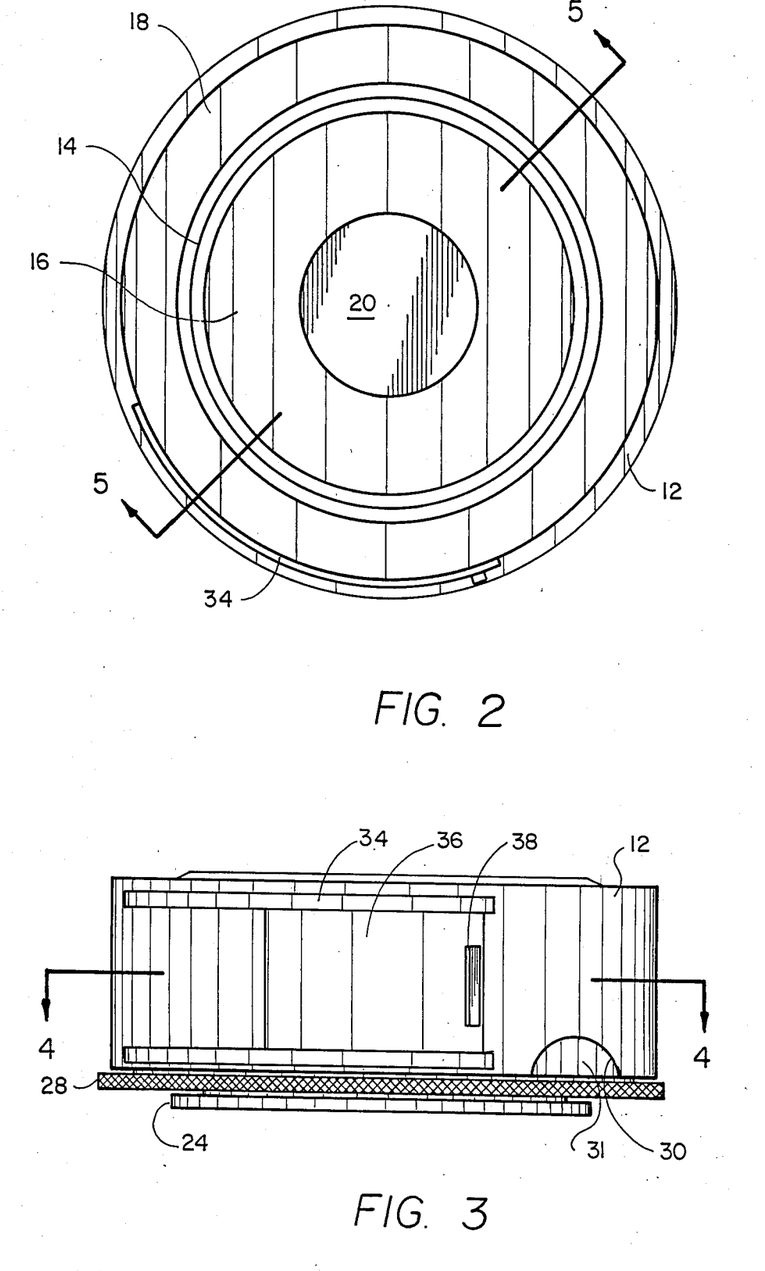
FIG. 2 is a bottom view of the hollow cylindrical housing of the carrousel holder of the present invention.
FIG. 3 is a side view of the carrousel holder of the present invention.

In FIG. 2, a bottom view is provided, illustrating the housing 12, removed from the carrousel holder 10.

In FIG. 3, it may be understood that the arcuate cutout 30 provides access to a stepped cylindrical side wall 31 of the enclosed carrousel wheel. The outer rim surface 28 of the carrousel wheel may be provided with a knurled or other friction enhancing surface to facilitate manual manipulation by a user.

Figure 4:
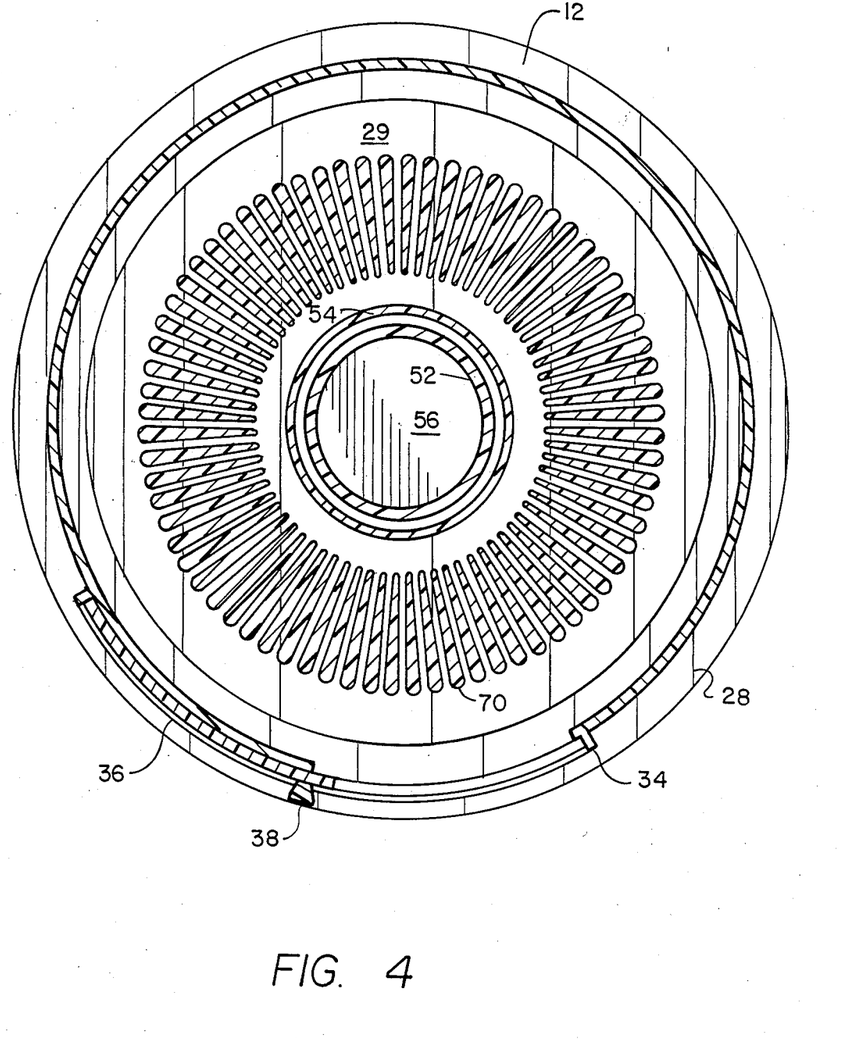
FIG. 4 is a cross sectional view, taken along line 4—4 of FIG. 3 illustrating the circular divider array.

In FIG. 4, a cross sectional view is provided, which illustrates the spaced circular array of vertical dividers 70 on carrousel wheel floor 29. An upstanding cylindrical hub 54 forms a circular central aperture which receives a hollow central cylindrical tube 52. The bottom edge of the tube 52 is frictionally retained by engagement with a raised cylindrical interior floor portion 56 of the stationary base plate 24. The carrousel wheel 29 is supported for rotation about the cylindrical tube 52, by a bearing mechanism to be subsequently described. In use, a single computer storage disk may be inserted for storage between each pair of upstanding vertical dividers 70. By rotating the carrousel wheel rim 28, any selected disk may be brought into alignment with the opening of the sliding door 36.

Figure 5:
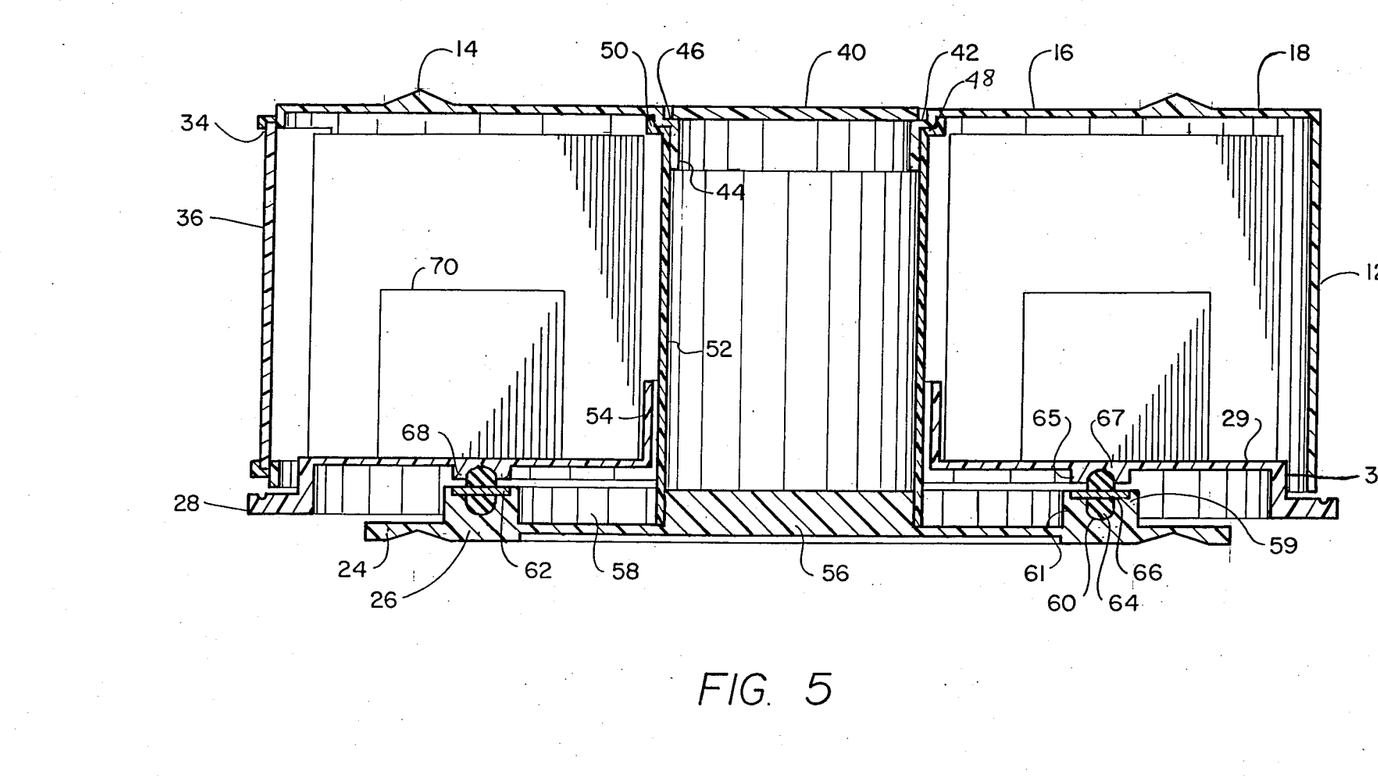
FIG. 5 is a cross sectional view, taken along line 5—5 of FIG. 2, illustrating the internal construction of the carrousel holder of the present invention.

As shown in the cross sectional view of FIG. 5, a plurality of rounded wheels 64, each having a central aperture 66 receiving an axle 62, are mounted for rotation in a wheel well 60 formed by an inner upstanding circular wall 61 and an outer radially spaced upstanding vertical cylindrical wall 59. The inner upstanding cylindrical wall 61 has an interior cylindrical side wall 58 which faces the stationary central hollow tube 52. The carrousel wheel 29 has an annular recessed wheel track 68 formed by an inner downwardly extending vertical cylindrical wall 65 and a radially spaced outer downwardly extending vertical cylindrical wall 67. As may now be readily understood, the carrousel wheel 29 is supported for rotation on the spaced wheels 64 for rotation about the stationary tube 52. As illustrated, the hub 54 of the carrousel wheel 29 receives the stationary tube 52 with clearance. The entire circular periphery of the stepped cylindrical side wall 31 of the carrousel wheel 29 may be color coded into various sectors by applying various colored paper stickers. By virtue of this arrangement, the stored computer disks may be each affixed with matching colored labels to provide a color coded index to various disk groupings. The disks may additionally bear other numerical indicia and labels. The top end of the tube 52 is provided with a radially outwardly extending stepped rim 50 which abuts the interior top wall of the housing 12. A cover mounting support ring 44 formed integrally with the housing 12, has a similar radially outwardly stepped rim 46 which is supported by the ledge 48 of the tube 52. A cylindrical transparent plastic disk cover 40 is removably received on the ledge 42 of the support ring 44. As illustrated, the support ring 44 and stepped rim 50 form a stepped abutment for locating the tube 52 relative to the housing 12. The bottom end of the tube 52 is frictionally engaged with the raised cylindrical interior floor portion 56 of the stationary base plate 24. As is now apparent, the base plate 24, tube 52 and housing 12 remain in a stationary position. The carrousel wheel 29 may be manually rotated by manipulation of the rim 28. Thus, only a small portion of the entire carrousel holder is actually rotated. This enables a plurality of carrousel holders to be stacked one atop the other as previously described. The interior of the tube 52 forms a storage compartment for pens, pencils, etc. Suitable dividers (not shown) may be provided within the interior of tube 52 for forming a plurality of separate storage compartments.

Figure 6:
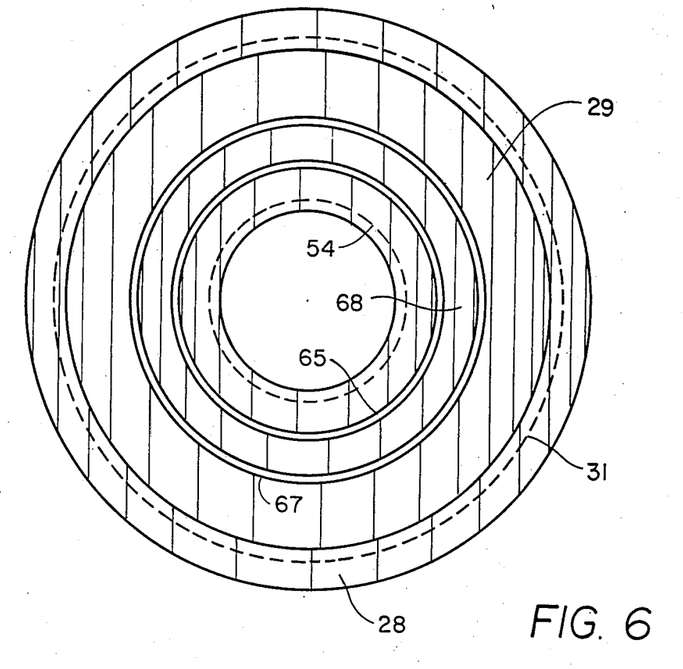
FIG. 6 is a bottom view of the carrousel wheel of the carrousel holder of the present invention.

FIG. 6 provides a bottom view of the carrousel wheel 29, removed from the carrousel holder. The recessed annular wheel track 68 is formed between the cylindrical walls 65 and 67.

Figure 7:
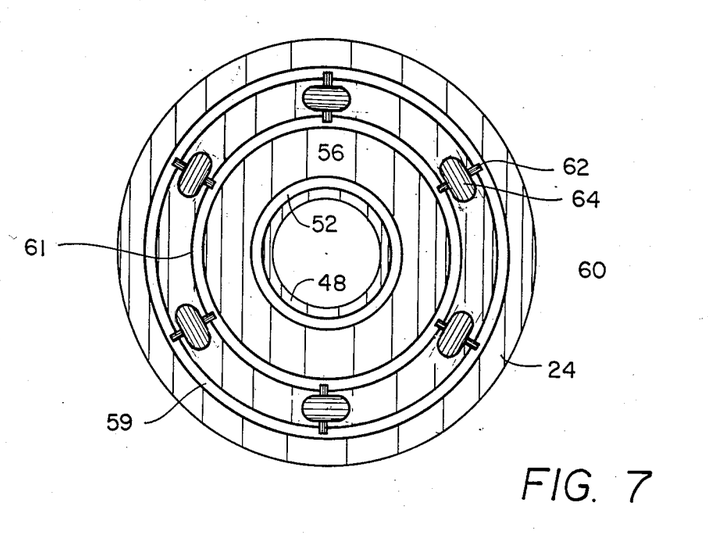
FIG. 7 is a top view of the stationary base plate of the carrousel holder of the present invention.

In FIG. 7, a top view of the base plate 26 is depicted, removed from the rest of the components of the carrousel holder. As may now be readily understood, a plurality of wheels 64 are rotatably mounted in a spaced circular array about the recessed wheel well 60 formed by the upstanding cylindrical side walls 59 and 61.

Figure 8:
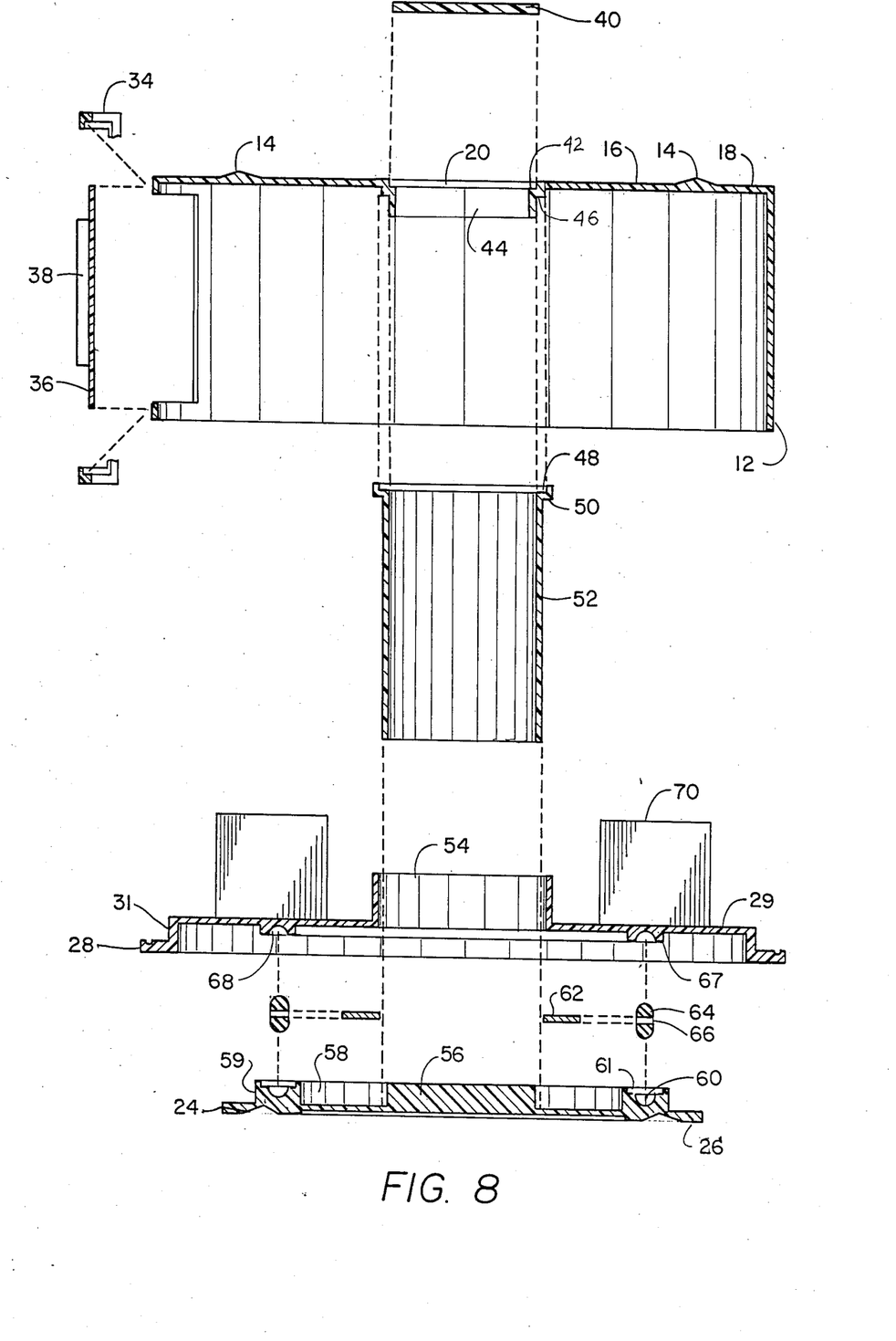
FIG. 8 is an exploded transverse cross sectional view illustrating the assembly of the various components of the carrousel holder of the present invention.

FIG. 8 provides an exploded cross sectional view, similar to FIG. 5. The manner of assembly of the various components may now be readily understood. While the base plate 26 and central tube 52 have been illustrated as separate components, it is to be understood that the base plate 26 and tube 52 may be formed as an integral molding, without departing from the scope of present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A carrousel holder for computer disks, comprising:
   a circular base plate;
   a V-shaped recess in a bottom surface of said base plate;
   a pair of spaced vertically upstanding cylindrical walls on an upper surface of said base plate, forming an annular recessed wheel well;
   a plurality of rotatably mounted wheels evenly spaced around said annular wheel well;
   a hollow cylindrical tube perpendicularly connected to a central interior floor portion of said upper base plate surface;
   a carrousel wheel having a bottom surface provided with a pair of spaced vertically downwardly extending cylindrical walls forming an annular recessed wheel track, said wheel track rotatably supporting said carrousel wheel on said rotatably mounted wheels;
   a cylindrical hub having a central circular aperture extending upwardly from an upper surface of said carrousel wheel, said hub received in spaced coaxial relation around said hollow cylindrical tube;
   a plurality of upstanding dividers evenly spaced in a circular array on said upper surface of said carrousel wheel;

a vertically extending stepped cylindrical side wall formed at an outer peripheral edge of said carrousel wheel;

said stepped cylindrical side wall divided into a plurality of various color coded sectors;

a radially outwardly extending circular rim connected to said stepped cylindrical side wall;

a hollow cylindrical housing formed from a transparent plastic material;

a first end of said housing having a central circular aperture;

a second end of said housing being open and enclosing said carrousel wheel upper surface, said second housing end slightly spaced above said radially outwardly extending circular carrousel wheel rim;

said carrousel wheel mounted for relative rotation with respect to said housing;

an annular V-shaped step on a top outer wall at said first end of said housing;

a stepped radial rim formed at an upper end of said hollow cylindrical tube, forming an annular ledge;

an upper end of said hollow cylindrical tube abutting an inner top wall of said housing;

a cover mounting support ring having a stepped radial rim abutting said annular ledge, said support ring received within said hollow cylindrical tube;

a removable circular cover disk supported by said support ring;

an arcuate rectangular opening in a cylindrical side wall of said housing;

and a slidable door for selectively opening and closing said arcuate rectangular opening.

2. The carrousel holder of claim 1, further comprising at least one arcuate cutout in said cylindrical side wall of said housing, adjacent said slidable door for facilitating manual rotation of said carrousel wheel.

* * * * *